United States Patent [19]

Rabek

[11] 3,731,541
[45] May 8, 1973

[54] COMBINATION FITTING
[75] Inventor: Elmer E. Rabek, Westerville, Ohio
[73] Assignee: Reliance Electric Company
[22] Filed: Jan. 24, 1972
[21] Appl. No.: 220,196

[52] U.S. Cl. .................................73/493, 73/71.2
[51] Int. Cl. ................................................G01h 1/00
[58] Field of Search..........................73/493, 71, 71.2

[56] References Cited

UNITED STATES PATENTS 1,797,235    3/1931    Kasley....................................73/71.2

Primary Examiner—James J. Gill
Attorney—George V. Woodling et al.

[57] ABSTRACT

An accelerometer and grease fitting is combined in a single body and has a male pipe thread fitting to thread into the threaded aperture on a machine for a normal grease fitting. In this way a combined accelerometer and grease fitting replaces a normal grease fitting without the need for providing a special mounting of the accelerometer.

20 Claims, 3 Drawing Figures

COMBINATION FITTING

BACKGROUND OF THE INVENTION

Speed responsive devices such as governors are a form of movement responsive devices. Such governors are well-known and have been known for at least 80 years to control the speed of machinery. Also on such old governors there has been a rotating shaft to rotate the governor weights and it has been customary to provide a grease cup on the machine to lubricate the shaft at its bearing with the machine. Accelerometers have also been known for many years are are used to measure a different form of movement; namely, a force proportional to acceleration or vibration in a machine. Usually such accelerometers are provided on a removable mounting, for example, a central stud or flange mounting so that the accelerometer may be removably secured to a machine, the acceleration of which it is desired to measure. The prior art method of mounting the accelerometer often has required that the machine be specially prepared to receive such accelerometer mounting. For example, a flat surface must be prepared, a hole drilled, threads tapped in the hole and then a machine screw used to secure the accelerometer to the machine with a part of the accelerometer bearing on the prepared flat surface. This is a sufficiently complicated mounting procedure that one is usually discouraged from mounting an accelerometer for only a short run or for an incidental purpose. One must really want to mount such accelerometer to the machine before such is undertaken.

Accordingly, an object of the invention is to provide a simplified accelerometer mounting on a machine.

Another object of the invention is to provide a simplified means to mount a movement responsive device and lubrication fitting on the machine.

Another object of the invention is to provide a method of mounting a movement responsive device on a machine.

Another object of the invention is to provide a method of replacing an existing lubrication fitting with a combined lubrication fitting and movement responsive device.

Another object of the invention is to provide a movement responsive device which threads into an existing threaded aperture in a machine for a lubrication fitting, yet still retains the lubrication capability.

SUMMARY OF THE INVENTION

The invention may be incorporated in a combined movement responsive device and lubrication fitting, comprising in combination, a metal body, a mounting connection on said body for mounting to a machine, a lubrication fitting on one side of said body, an internal lubricant passageway communicating internally of said body between said mounting connection and said lubricant fitting, a movement responsive device having first and second parts and an electrical output means, and means mounting said first and second parts on said body for relative movement to establish an output on said electrical output means in accordance with movement of a machine to which mounted.

Other objects and a fuller understanding of the invention may be had by referring to the following description and claims, taken in conjunction with the accompanying drawing.

DESCRIPTION OF THE PREFERRED EMBODIMENT

Figure 2:
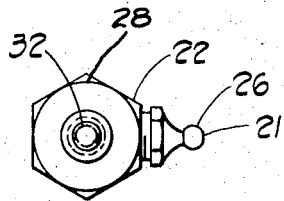
FIG. 2 is a top view of the combined fitting and device of FIG. 1.
Figure 1:
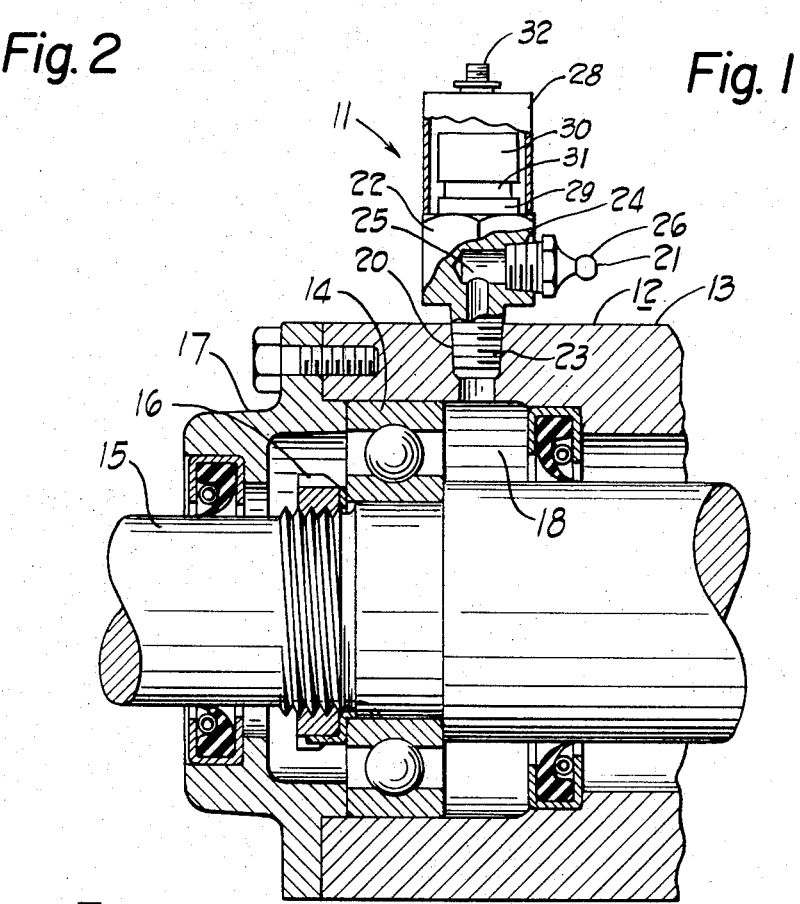
FIG. 1 is a side elevational view of a combined lubrication fitting and movement responsive device of the invention and mounted on a machine.

FIGS. 1 and 2 illustrate a combined movement responsive device and lubrication fittitg 11 for use with a machine 12. The machine may be one which has a frame 13 with a bearing 14 journalling a shaft 15. The bearing 14 may be a sleeve or roller bearing or as shown in FIG. 1 may be a ball bearing. It may be retained in the frame 13 by any suitable means such as the retaining nut 16 on the shaft 15 and by the retaining flange 17 secured to the frame 13. A grease chamber 18 within the frame 13 and adjacent to the bearing 14 houses grease or other suitable lubricant to lubricate such bearing. The machine has a lubrication mounting 20 which in this preferred embodiment is in the form of a drilled and tapped aperture. As an example, this might be an ⅛ inch national pipe taper thread. Such lubrication mounting 20 receives a normal lubrication fitting or grease fitting 21 in the usual use and construction of the machine.

The preferred embodiment of the invention as shown in FIGS. 1 and 2 shows the combined movement responsive device and lubrication fitting 11 as mounted on this lubrication mounting 20 of the machine 12. This combined device and fitting includes generally a body 22 with a mounting connection 23. The body 22 is preferably metal such as steel and the mounting connection is preferably a male threaded stud with a taper thread complementary to that of the lubrication mounting 20. The body 22 also has on one side thereof a tapped aperture 24 into which is threaded the grease fitting 21. This may be a grease fitting already provided with the body 22 or may be the grease fitting just removed from the existing lubrication mounting aperture 20. The body 22 is formed internally with an internal lubricant passageway 25 interconnecting the grease fitting 21 and the lubricant mounting 20. The grease fitting 21 may be the well-known Zerk fitting with a convexly curved outer surface 26 on the end thereof to receive a conventional grease gun. When such grease gun is used, the lubricant is conveyed by the passageway 25 to the grease chamber 18.

The body 22 also has a movement responsive device 28 mounted relative to this body 22. In this preferred embodiment the movement responsive device is an accelerometer which has first and second parts 29 and 30 and electrical output means 31. The first and second parts are mounted on the body 22 for relative movement. This is accomplished by mounting the first part 29 fixed on the body 22 and mounting the second part 30 for movement relative to the first part in accordance with an acceleration force. By way of example, the electrical output means may be a piezoelectric crystal which is fastened between the first and second parts 29 and 30. Accordingly, the inertia of the second part 30 under an acceleration force applies a force to the crystal 31 to develop an output voltage which appears at an electrical terminal 32 relative to the body 22. For example, when vibration of the machine 12 is desired to be measured, this accelerometer will accomplish this by establishing an intermittent force on the electrical output means 31 in accordance with such vibration or acceleration force.

OPERATION

The combined movement responsive device and lubrication fittinG 11 may be mounted very easily on a machine 12, the movement of which is desired to be determined. This device 11 may be a vibration sensitive device, a velocimeter or an accelerometer as disclosed for this preferred embodiment. The machine will have an existing grease fitting 21 in the lubrication mounting 20 or else such lubrication mounting may be provided for the machine. To place the device in operation it is only necessary to screw the mounting connection 23 of the body 22 into this threaded grease fitting aperture 20 and connect electrical terminal 32 to the measuring instrument.

The mounting connection 23 performs a dual function of providing a lubricant passage and also being a solid connection to transmit acceleration and vibration forces to the body 22. In such case when the machine is running, the acceleration due to vibration, for example, may be measured quite readily and without any permanent change to the machine. Also if the accelerometer is desired to be left in place for a long time, the machine may still be lubricated at the normal lubrication intervals by use of the grease fitting 21 on the side of the body 22. When it is desired to remove the accelerometer from the machine it simply may be unscrewed and the grease fitting such as fitting 21 screwed into the lubrication mounting 20. This restores the machine to its normal configuration. It will be noted from FIG. 1 that the grease fitting 21 is on one side of the body 22, the mounting connection 20 is on a second side of the body and the electrical output at the terminal 32 is on the third side of the body. By this means the functions and structure of each are separated so as to be non-interfering.

Figure 3:
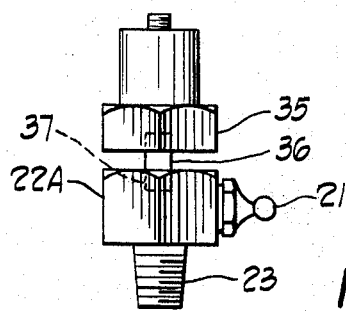
FIG. 3 is a side elevational view of a modification of the invention.

FIG. 3 shows a modification of the invention wherein the body 22A is provided with a sub-body 35. The first and second parts of the movement responsive device are provided within the sub-body 35 which in turn is fastened by a mounting stud 36 in a threaded aperture 37 in the top of the body 22A. This body 22A is similar to body 22 of FIGS. 1 and 2 in that it has a grease fitting 21 and a mounting connection 23 connected internally by a lubricant passageway. In this FIG. 3 the construction is such that the accelerometer sub-body 35 may be selectively removed and mounted to the body 22A rather than being unitary with such body as in FIGS. 1 and 2. This has the advantage of providing a ready mounting for the accelerometer or other movement responsive in the sub-body 35 without having to disturb the grease fitting 21.

The present combined movement responsive device and lubrication fitting eliminates much work previously required to mount such a device on a machine. One procedure was to grind or otherwise form a flat surface on a suitable location of the machine. Next a hole was drilled in the frame of the machine at this location. Third, a tap was used to form female threads in this aperture and fourth, a machine screw was used to secure the accelerometer tightly to the machine with a a portion of the accelerometer engaging the flat surface. This required considerable time and also a number of different tools in order to prepare the machine and mount the accelerometer. The present invention makes such mounting exceedingly simple. With a simple wrench the existing grease fitting may be unscrewed from the machine and this combined device and fitting screwed in its place. The grease chamber is still able to be lubricated and the simple electrical connection 32 may be connected to suitable instrumentation to measure the movement, e.g., acceleration. This fact, that the mounting is so much simplified, permits random checking of vibration on machinery where it was previously prohibited by the cost of making such mounting.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A combined movement responsive device and lubrication fitting, comprising in combination,
   a metal body,
   a mounting connection on said body for mounting to a machine,
   a lubrication fitting on one side of said body,
   an internal lubricant passageway communicating internally of said body between said mounting connection and said lubricant fitting,
   a movement responsive device having first and second parts and an electrical output means,
   and means mounting said first and second parts on said body for relative movement to establish an output on said electrical output means in accordance with movement of a machine to which mounted.

2. A combined movement responsive device and lubrication fitting as set forth in claim 1, wherein said mounting connection is a threaded connection.

3. A combined movement responsive device and lubrication fitting as set forth in claim 1, wherein said mounting connection is a male connection.

4. A combined movement responsive device and lubrication fitting as set forth in claim 1, wherein said mounting connection is a male threaded connection.

5. A combined movement responsive device and lubrication fitting as set forth in claim 1, wherein said lubrication fitting is a grease fitting.

6. A combined movement responsive device and lubrication fitting as set forth in claim 1, wherein said mounting means mounts said first part fixed on said body.

7. A combined movement responsive device and lubrication fitting as set forth in claim 1, wherein said movement responsive device is an accelerometer.

8. A combined movement responsive device and lubrication fitting as set forth in claim 1, wherein said mounting connection is on a second side of said body,
and said electrical output means is on a third side of said body.

9. A combined device and fitting as set forth in claim 1, wherein said first part is unitary with said body.

10. A combined device and fitting as set forth in claim 1, including a sub-body,
means mounting said first part on said sub-body,
and means mounting said sub-body on said body.

11. The method of combining a lubrication fitting and a movement responsive device for a machine, comprising the steps of,
forming a body with a mounting connection complementary to a lubrication mounting on a machine,
providing a lubrication fitting on said body,
making a lubrication passageway internally of said body interconnecting said mounting connection and said lubrication fitting,
providing first and second parts and electrical output means,
and mounting said first and second parts relative to said body for relative movement to develop an electrical output on said electrical output means in accordance with such relative movement.

12. The method as set forth in claim 11, including mounting said mounting connection on the lubrication mounting of a machine.

13. The method as set forth in claim 11, including forming said mounting connection as a male connection.

14. The method of claim 11, including forming said mounting connection as a threaded connection.

15. The method of claim 11, including forming said mounting connection as a threaded male connection.

16. The method of claim 11, including providing a male grease fitting as said lubricating fitting.

17. The method of claim 16, including providing on said male lubrication fitting a convexly curved outer surface for connecting to a grease gun.

18. The method of claim 11, wherein the mounting of said first and second parts develops an electrical output on said electrical output means in accordance with an acceleration force.

19. The method of claim 11, wherein said mounting of said first and second parts is mounting said first part fixed on the body and said second part movable relative to the body.

20. The method of claim 11, including forming a sub-body,
mounting said first part on said sub-body,
and mounting said sub-body on said body.

* * * * *